United States Patent [19]

Rayment

[11] 4,247,125

[45] Jan. 27, 1981

[54] WHEELCHAIR

[76] Inventor: Ena M. Rayment, 105, Ewhurst Rd., Brockley, London SE4, England

[21] Appl. No.: 36,444

[22] Filed: May 7, 1979

[30] Foreign Application Priority Data

May 8, 1978 [GB] United Kingdom .............. 18191/78

[51] Int. Cl.[3] .............................................. B62B 5/02

[52] U.S. Cl. .................................. 280/5.24; 280/250

[58] Field of Search ...................... 280/5.2, 5.22, 5.24, 280/5.26, 5.28, 5.3, 5.32, 242 WC, 211, 249, 250, DIG. 10, 767, 47.16, 47.2, 289 WC, 79.2; 180/8 R, 8 A, DIG. 3, 11, 15, 21, 22; 297/DIG. 4

[56] References Cited

U.S. PATENT DOCUMENTS

| | | | |
|---|---|---|---|
| 1,897,036 | 2/1933 | Appenheimer | 280/5.2 |
| 2,946,602 | 7/1960 | Lee | 280/211 |
| 3,976,152 | 8/1976 | Bell | 280/5.24 |

*Primary Examiner*—John J. Love
*Assistant Examiner*—Randall A. Schrecengost
*Attorney, Agent, or Firm*—Rogers, Eilers & Howell

[57] ABSTRACT

A wheelchair is constructed so as to be able to mount curbs, and overcome similar obstacles. In front and above each main wheel of the wheelchair, an auxiliary wheel or wheels are mounted, so that the auxiliary wheels will contact the obstacle at a point on their circumference below their center in such a way that they are able to ride up over the obstacle and lift the main wheels to a position where they can do likewise.

8 Claims, 14 Drawing Figures

WHEELCHAIR

BACKGROUND OF THE INVENTION

This invention relates to a wheelchair.

There are conventional wheelchairs which have a pair of front wheels and a pair of rear wheels and can be propelled by the person sitting in the chair who turns one of the pairs of wheels by hand. This makes it possible for the wheelchair to be manoeuvred over limited distances, but it is virtually impossible for a chair being propelled in this way to be driven over a curb or step.

SUMMARY OF THE INVENTION

According to the present invention, there is provided a wheelchair having a plurality of ground-engaging wheels rotatable about respective spaced front and rear axes and at least one auxiliary ground wheel associated with each ground-engaging wheel axis, each auxiliary wheel being mounted for rotation about an axis which is parallel to the associated ground-engaging wheel axis, but is positioned in front of the associated ground-engaging wheel axis, as seen in the intended direction of movement of the wheelchair, and arranged so that the auxiliary wheel is normally out of contact with the ground.

With this arrangement, the wheelchair will move in the normal way on flat ground, with just the ground-engaging wheels in contact with the ground. When a step or curb is reached, the rims of the auxiliary wheel or wheels ahead of the front wheels of the wheelchair will first contact the edge of the step and can then be driven up onto the step. The associated ground-engaging wheel will then be lifted off the ground, and can subsequently be driven up over the step, since the distance from the bottom of this ground-engaging wheel to the top of the step will then be reduced.

In a preferable embodiment, one or more of the auxiliary wheels is turned manually by the person sitting in the wheelchair and is connected through a drive connection to associated ground-engaging wheels.

BRIEF DESCRIPTION OF THE DRAWINGS

The invention will now be further described, by way of example, with reference to the accompanying drawings, in which.

DETAILED DESCRIPTION OF A PREFERRED EMBODIMENT

Figure 1:
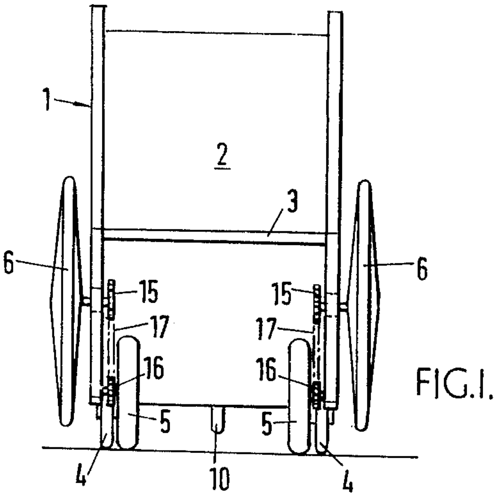
FIG. 1 is a rear view of a wheelchair according to the invention.
Figure 2:
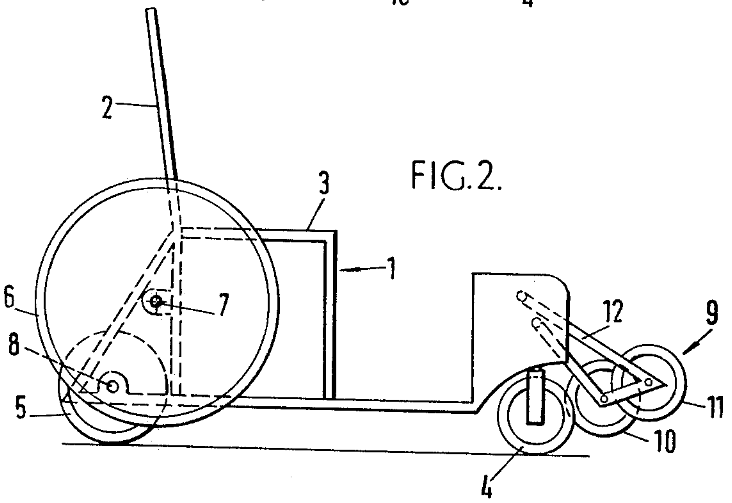
FIG. 2 is a side view of the chair shown in FIG. 1, omitting the drive mechanism.

The wheelchair has a frame 1 including a back 2 and a seat 3. Front ground-engaging or main wheels 4 and rear ground-engaging or main wheels 5 are mounted for rotation about horizontal axes in the standard way.

As can be seen in FIG. 1, a pair of large auxiliary wheels 6 are mounted outside the rear wheels 5, for rotation about an axis 7 which is above and in front of the axis 8 of the rear wheels 5. These auxiliary wheels 6 are provided with tires and with the conventional hand wheels around their circumference.

Figure 3:
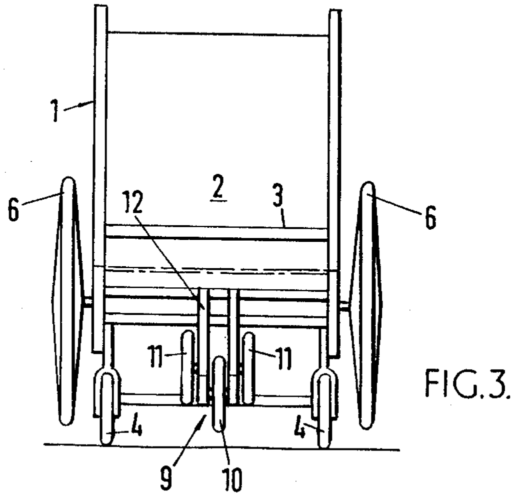
FIG. 3 is a front view of the chair of FIG. 1.

As can be seen in FIG. 3, an auxiliary wheel assembly 9 is mounted between the two front wheels 4. This front wheel assembly consists of two leading auxiliary wheels 11, and one intermediate auxiliary wheel 10. The auxiliary wheels 10 and 11 are mounted for rotation on a framework 12. The axes of the wheels 10 and 11 are arranged ahead of and above the axes of the coaxial wheels 4.

The front ground engaging wheels 4 can swivel about vertical axes 13 and 14, in a conventional way, to allow the chair to be steered.

Figure 4:
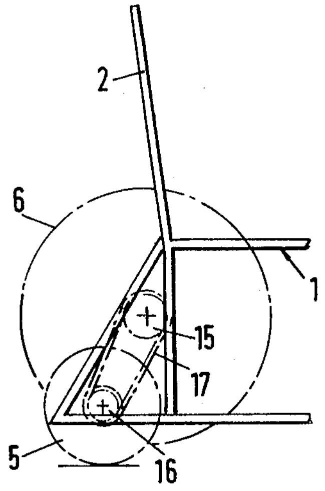
FIG. 4 is a side view of the rear wheels of the chair showing the drive mechanism.
Figure 5:
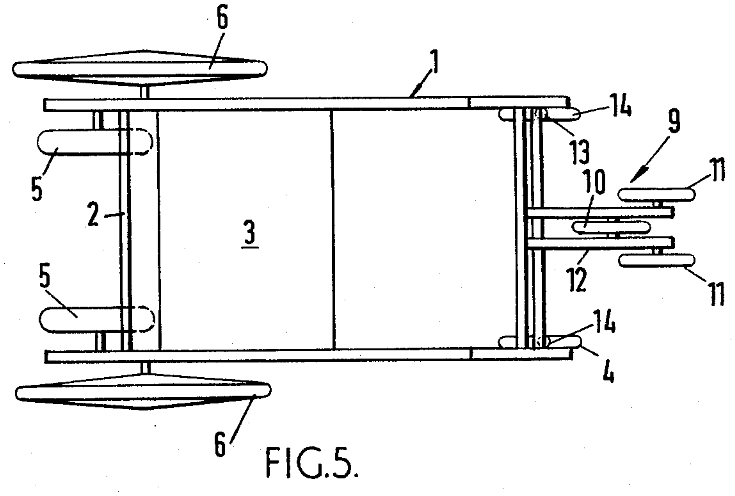
FIG. 5 is a plan view of the chair, omitting the drive mechanism.

In the embodiment shown, the chair can be propelled by its occupant who rotates the wheels 6. The inner ends of the axes of these wheels 6 are provided with sprocket wheels 15, and cooperating sprocket wheels 16 are provided on the axes of the ground-engaging wheels 5. A chain 17 (see FIG. 4) runs over each pair of sprocket wheels 15, 16 so that rotation of auxiliary wheels 6 produces corresponding rotation of the ground engaging wheels 5.

The relative number of teeth on sprocket wheels 15 and 16 should be chosen to enable the chair to be propelled at a reasonable speed without excessive effort by a person in the chair turning the wheels 6. It has been found in practice that the chain wheel and drive wheel of a bicycle provide a suitable ratio, the chain wheels being mounted on the axes of the auxiliary wheels 6.

Other suitable transmission mechanisms could be used to transfer rotation of wheels 6 to wheels 5. Alternatively, the wheels 5 could be driven by a completely separate power source which may be a motor, or may be operated in a different way by the wheelchair occupant.

The chair can of course still be pushed by somebody walking behind.

Figure 6:
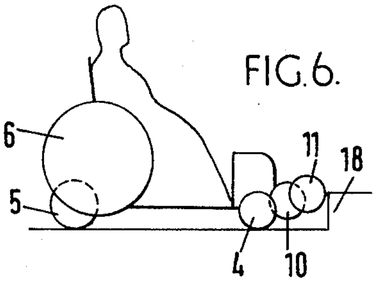
FIGS. 6 to 14 show the chair in various stages of climbing a step.
Figure 7:
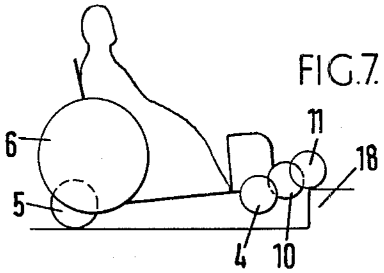
Figure 8:
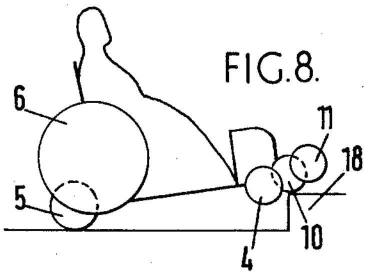
Figure 9:
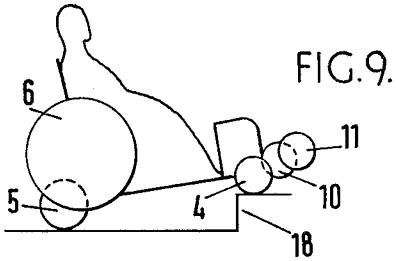
Figure 10:
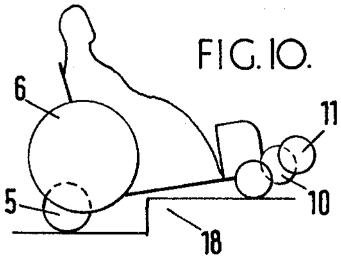

FIGS. 6 to 14 will now be described. In FIG. 6, a chair is shown approaching a curb 18. Initially, a point of the circumference of wheel 11 will contact the corner of the curb. The point of contact will be below the axis of the wheel 11, and further drive from the rear wheels will cause the wheel 11 to rotate so that it mounts the curb. A similar process then takes place with wheel 10 and with wheel 4 to reach the position shown in FIG. 9.

Figure 11:
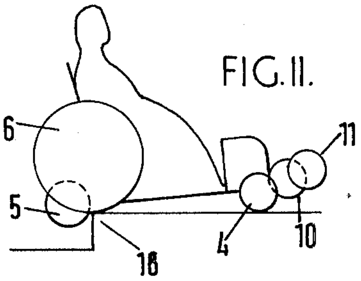
Figure 12:
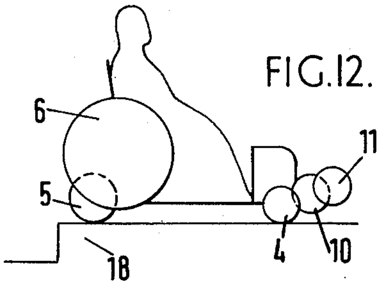
Figure 13:
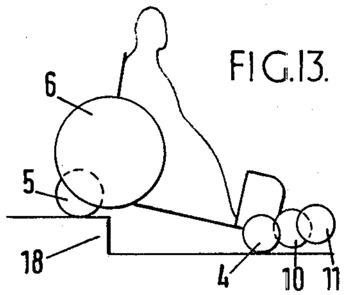
Figure 14:
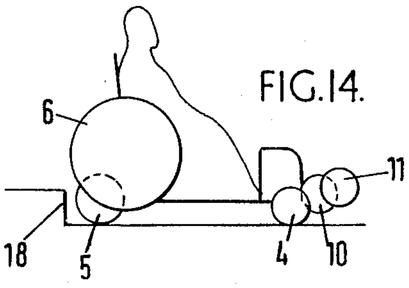

When the rear wheels approach the curb, a point on the circumference of auxiliary wheel 6 is the first to contact the corner of the curb, and this will then be driven up onto the curb as shown in FIG. 11, when the corner of the curb will contact a point on the circumference of rear wheels 5 which are then driven up onto the curb. The chair is thus completely raised on the curb, as shown in FIG. 12. FIGS. 13 and 14 show the chair descending a curb.

If the wheelchair is to be propelled by its occupant over a curb or step, either both front and rear wheels must be driven, or both one of the pairs of wheels and its auxiliary wheel or wheels must be driven, i.e. the driven wheels must be at least one of the following combinations: 4 and 5; 5 and 6; or 4, 10 and 11. In the embodiment described, wheels 5 and 6 are driven.

I claim:

1. A wheelchair having a plurality of ground-engaging wheels rotatable about respective spaced front and rear axes, and at least one auxiliary ground wheel associated with each ground-engaging wheel axis, each auxiliary wheel being mounted for rotation about an axis which is parallel to the associated ground-engaging wheel axis, but is positioned in front of the associated ground-engaging wheel axis, as seen in the intended direction of movement of the wheelchair, and arranged so that the auxiliary wheel is normally out of contact with the ground.

2. A wheelchair as claimed in claim 1, having a pair of front ground-engaging wheels and a pair of coaxial rear ground-engaging wheels, an auxiliary wheel assembly mounted between the two front wheels, and associated with both front wheels, and single auxiliary wheels associated with each of the rear wheels.

3. A wheelchair as claimed in claim 2, wherein the auxiliary wheel assembly comprises a first auxiliary wheel axis ahead of and above the axes of the front ground-engaging wheels, and a second auxiliary wheel axis above and ahead of the first auxiliary wheel axis.

4. A wheelchair as claimed in claim 2, wherein the auxiliary wheels associated with the rear ground-engaging wheels are of larger diameter than the rear ground-engaging wheels.

5. A wheelchair having a pair of front ground-engaging wheels and a pair of coaxial rear ground-engaging wheels, an auxiliary wheel assembly mounted between the two front wheels, and associated with both front wheels, and an auxiliary wheel associated with each of the rear wheels, each auxiliary wheel being mounted for rotation about an axis which is parallel to the associated ground-engaging wheel axis, but is positioned in front of the associated ground-engaging wheel axis, as seen in the intended direction of movement of the wheelchair, and arranged so that the auxiliary wheels are normally out of contact with the ground, the auxiliary wheels associated with the rear ground-engaging wheels being of larger diameter that the rear ground-engaging wheels, and at least one of the rear ground-engaging wheels being drivingly connected to its associated auxiliary wheel, so that rotation of the auxiliary wheel drives the ground-engaging wheels and the chair.

6. A wheelchair as claimed in claim 5, wherein the auxiliary wheel assembly comprises a first auxiliary wheel axis ahead of and above the axes of the front ground-engaging wheels, and a second auxiliary wheel axis above and ahead of the first auxiliary wheel axis.

7. A wheelchair as claimed in claim 5, wherein the driving connection comprises a chain running over sprocket wheels on the axis of the respective auxiliary and ground-engaging wheels.

8. A wheelchair as claimed in claim 5, wherein said driving connection is provided on each of the rear wheels, and the auxiliary wheels associated with the rear wheels are arranged so that they may be manually rotated by a person sitting in the pushchair.

* * * * *